United States Patent Office.

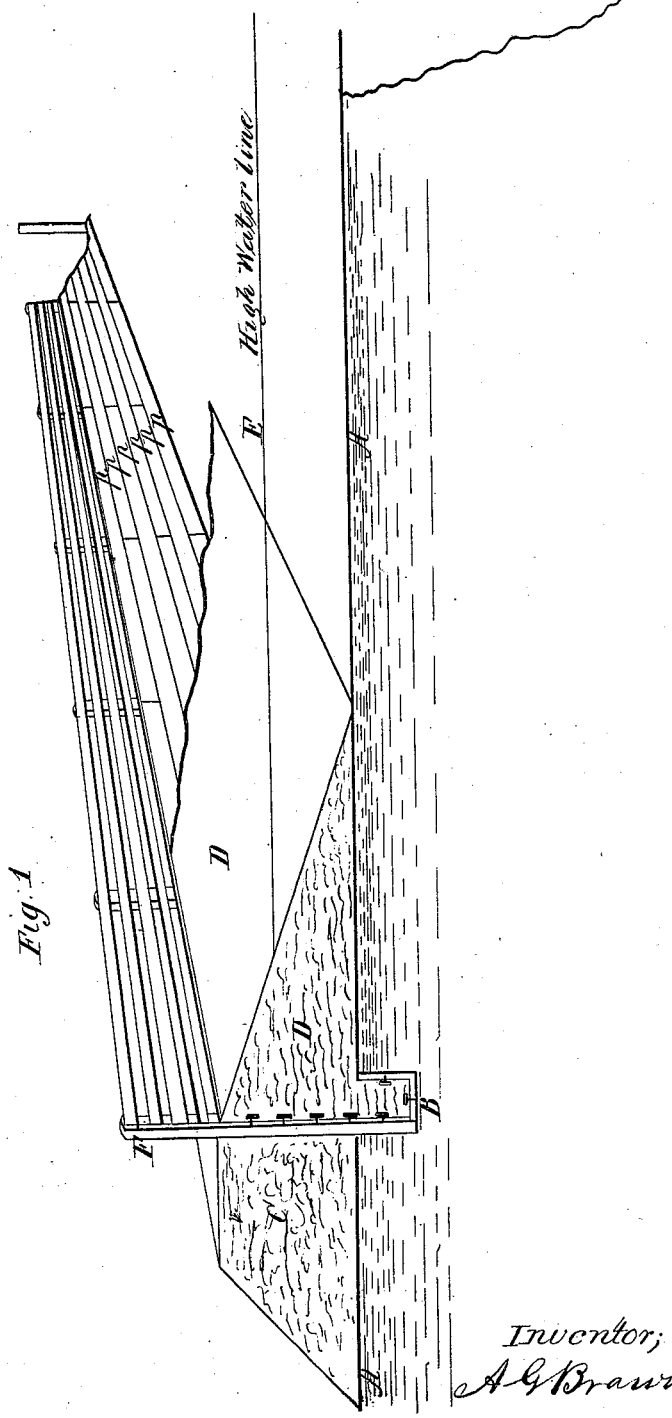

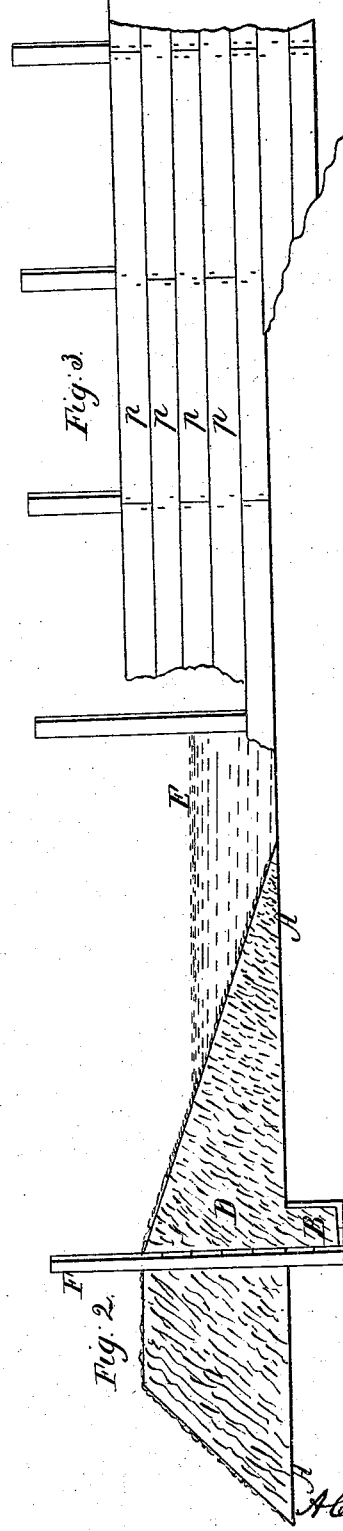

ALEXANDER G. BRAWNER, OF FRANKFORT, KENTUCKY.

Letters Patent No. 92,575, dated July 13, 1869.

---

IMPROVED LEVEE.

---

The Schedule referred to in these Letters Patent and making part of the same.

---

To all whom it may concern:

Be it known that I, ALEXANDER G. BRAWNER, of the city of Frankfort, in the county of Franklin, in the State of Kentucky, have invented certain new and useful Improvements in the Construction of Embankments and Levees, for the protection of lands, &c., against the overflow of streams, lakes, tide-waters, and other bodies of water; and I do hereby declare that the following is a full, clear, and exact description thereof, reference being had to the accompanying drawings, and to the letters of reference marked thereon.

The nature of my invention consists in placing an upright fence, made of posts planted deeply in the earth in the central portion of the embankment, and nailing upon them horizontal timbers or planks, closely fitted together, and then packing the earth firmly against such fence; and further, in having such posts extend any desired distance above the crest of the levee, in order that planks may be nailed upon them, and thus make a fence to enclose the land, and exclude or include horses, horned cattle, hogs, &c.

To enable others skilled in the art to make and use my invention, I will proceed to describe the same.

In the drawings—

Figure 1 represents an end view of a levee, in perspective;

Figure 2, a cross-section thereof; and

Figure 3, an elevation of the same.

On the line of the proposed levee, and near its longitudinal centre, a ditch, B, should be dug at least two feet deep, and wide enough to afford room for planting posts and nailing upon them the planks, and for packing firmly a strong line of earth on each side of the wooden structure; and in the centre of the ditch, posts E, of the desired length and size, and of durable wood, should be planted, in line and at such distances apart as will secure sufficient strength in the structure, on the one hand, and not result in a waste of timber and labor on the other.

Then, upon the inner or water-side of the line of these posts, planks p, of durable wood, should be nailed, and closely fitted together, or the joints between may be covered by battens of plank; and to insure uniformity in the strength of the structure, the planks should be arranged on the posts in such a manner that an equal number of plank-ends should be fastened upon each post, as shown in fig. 3. This close boarding should extend at least as high as the crest of the levee.

Then, upon each side of the fence, earth should be thrown into the ditch, and closely rammed, in order to hold the base of the fence firmly in position. But in localities where brick, or stones, or the trunks of trees may be abundant and cheap, the wall or fence may be made of any one or more of them.

When such a back-bone or skeleton shall have been made, of whatever material composed, then the earth is to be thrown up to the desired elevation, and such slopes given to the levee as may be desired, having reference to the character of the volume of water against which protection is sought.

The extending of the posts above the crest of the levee, to be used in the combination of a fence against domestic animals, is deemed an important feature in this invention, as a fence is necessary upon almost every levee. For in making such a fence, the posts are already almost immovably implanted where they are needed. The timbers in the tops is the only item of expense of the posts. And then they are greatly superior to posts planted on the crest of an ordinary levee, because of the looseness of the earth of which the tops of such levees are composed; for it is what is called "made earth," that is to say, brought from elsewhere and thrown there, and such levees are much liable to be injured, and crevasses formed in them, by many causes which would not affect levees made according to my invention.

The weight of the body of the excluded water causes the water to percolate gradually through the whole mass of earth, and thus impair its cohesive power to such an extent that it will crumble and fall away on the water-side, or be cut by currents and fall away in masses until a breech is formed through the whole levee.

In addition to this cause of injury, musk-rats, crawfishes, and other borers, are constantly and secretly at work, boring thousands of channels, by which the waters find their way into and through the embankment, and thus originate crevasses when and where they may be least expected.

It is obvious that a strong, close fence through the longitudinal centre of the levee, and reaching below the natural surface of the earth, will go far to prevent such injuries. For if that portion of the levee next the water should become softened by percolation, opened by borers, and washed away by the current, still the other and outer portion, being protected by the fence, will remain firm and intact, and it and the fence will resist the action of the water for a sufficient length of time for the repair of the levee. Even if the whole of the earth on the water-side of the fence should wash away down to the natural surfaces, yet the fence, with the dry, solid bank of earth in its rear, would for a considerable time prevent a breach being made.

What I claim as new, and desire to secure by Letters Patent, is—

The described levee, consisting of an impenetrable partition set in a trench, such trench being filled and the partition embanked by suitable material when the posts of the central core extend above the embankment, and form the supports for a fence upon the same, all substantially as described.

ALEXANDER G. BRAWNER.

Witnesses:
JAS. A. DAWSON,
RICHD. SHARP.